United States Patent
Yamazaki et al.

(10) Patent No.: US 9,843,190 B2
(45) Date of Patent: Dec. 12, 2017

(54) POWER SYSTEM MANAGEMENT DEVICE AND METHOD

(71) Applicant: Hitachi, Ltd., Chiyoda-ku, Tokyo (JP)

(72) Inventors: Jun Yamazaki, Tokyo (JP); Yasuo Sato, Tokyo (JP); Toshiyuki Sawa, Tokyo (JP); Taichiro Kawahara, Tokyo (JP)

(73) Assignee: Hitachi, Ltd., Tokyo (JP)

(*) Notice: Subject to any disclaimer, the term of this patent is extended or adjusted under 35 U.S.C. 154(b) by 656 days.

(21) Appl. No.: 14/461,974

(22) Filed: Aug. 18, 2014

(65) Prior Publication Data

US 2015/0084432 A1   Mar. 26, 2015

(30) Foreign Application Priority Data

Sep. 20, 2013   (JP) ................................. 2013-194808

(51) Int. Cl.
  *H02J 3/38*   (2006.01)
  *H02J 3/24*   (2006.01)
  *H02J 3/00*   (2006.01)

(52) U.S. Cl.
  CPC ............... *H02J 3/382* (2013.01); *H02J 3/24* (2013.01); *H02J 2003/007* (2013.01); *Y02E 40/76* (2013.01); *Y02E 60/76* (2013.01); *Y04S 10/545* (2013.01); *Y04S 40/22* (2013.01); *Y10T 307/74* (2015.04)

(58) Field of Classification Search
  None
  See application file for complete search history.

(56) References Cited

U.S. PATENT DOCUMENTS

2013/0253719 A1*   9/2013   Kubota ..................... G06F 1/26
                                                          700/291

FOREIGN PATENT DOCUMENTS

JP         2007-110809 A     4/2007

* cited by examiner

*Primary Examiner* — Thienvu Tran
*Assistant Examiner* — David M Stables
(74) *Attorney, Agent, or Firm* — Crowell & Moring LLP

(57) ABSTRACT

A power system management device which manages a system state in a power system includes a system state candidate calculation unit for calculating state amounts of the system state based on an objective function from system characteristic information indicating characteristic information of a system structure, an inter-state distance calculation unit for calculating an inter-state distance representing a similarity of values between state amounts of the system state calculated by the system state candidate calculation unit, and a variability evaluation value calculation unit for calculating a variability evaluation value in which a variability of the system state is evaluated, based on an objective function value calculated from the state amount of the system state calculated by the system state candidate calculation unit and the inter-state distance calculated by the inter-state distance calculation unit. The system state is selected based on the calculated variability evaluation value.

13 Claims, 12 Drawing Sheets

FIG. 4A

| NODE NAME | POWER GENERATION | | LOAD | | | PHASE MODIFYING EQUIPMENT | | |
|---|---|---|---|---|---|---|---|---|
| | NAME | CLASS | RATED CAPACITY | NAME | CLASS | RATED CAPACITY | NAME | CLASS | RATED CAPACITY |
| A | G1 | THERMAL POWER | 100 | --- | --- | --- | --- | --- | --- |
| B | G2 | HYDRAULIC POWER | 200 | --- | --- | --- | --- | --- | --- |
| ... | ... | ... | ... | ... | ... | ... | ... | ... | ... |
| AA | --- | --- | --- | L1 | HOUSE | 1000 | --- | --- | --- |
| BB | --- | --- | --- | L2 | FACTORY | 2000 | --- | --- | --- |
| ... | ... | ... | ... | ... | ... | ... | ... | ... | ... |
| AAA | --- | --- | --- | --- | --- | --- | D1 | SC | 10 |
| BBB | --- | --- | --- | --- | --- | --- | D2 | ShR | 20 |
| ... | ... | ... | ... | ... | ... | ... | ... | ... | ... |

FIG. 4B

| TRANSMISSION LINE NAME | NODES OF BOTH SIDES | POSITIVE-PHASE-SEQUENCE RESISTANCE R | POSITIVE-PHASE-SEQUENCE REACTANCE X | POSITIVE-PHASE-SEQUENCE CAPACITANCE C |
|---|---|---|---|---|
| a | A B | 0.01 | 0.2 | 0.1 |
| b | B C | 0.02 | 0.5 | 0.2 |
| ... | ... | ... | ... | ... |

FIG. 4C

| No. | CONSTRAINT OBJECT | CONSTRAINT CONDITION | | |
|---|---|---|---|---|
| | | CONSTRAINT OBJECT AMOUNT | MAXIMUM VALUE | MINIMUM VALUE |
| 1 | G1 | EFFECTIVE POWER GENERATION AMOUNT | 100 | 10 |
| 2 | D1 | PHASE MODIFYING AMOUNT | 10 | 0 |
| 3 | a | POWER FLOW AMOUNT | 500 | ... |
| ... | ... | ... | ... | ... |

FIG. 5

| OBJECTIVE FUNCTION NAME | INPUT x | | OBJECTIVE FUNCTION | | REMARKS |
| --- | --- | --- | --- | --- | --- |
| | NAME | CONTENT | FORM | CALCULATION FORMULA | |
| O1 | x1 | POWER GENERATION AMOUNT | min | f1(x1) | MINIMIZE FUEL COST |
| O2 | x1 | VOLTAGE | max | f2(x1,x2,···) | MAXIMIZE VOLTAGE STABILITY |
| | x2 | TIDAL CURRENT | | | |
| ··· | ··· | ··· | ··· | ··· | ··· |

FIG. 6A

| SYSTEM ELEMENT | CLASS | STATE AMOUNT | | | | | | | | | |
|---|---|---|---|---|---|---|---|---|---|---|---|
| | | SEARCH POINT 1 | | | | SEARCH POINT 2 | | | | | |
| | | INITIAL STATE (0TH) | FIRST UPDATE | ... | P-TH UPDATE | ... | INITIAL STATE (0TH) | FIRST UPDATE | ... | P-TH UPDATE | ... |
| G1 | POWER GENERATION AMOUNT | 90 | 80 | ... | 60 | ... | 50 | 70 | ... | 60 | ... |
| ... | ... | ... | ... | ... | ... | ... | ... | ... | ... | ... | ... |
| D1 | PHASE MODIFYING AMOUNT | 0 | 10 | ... | 10 | ... | 0 | 0 | ... | 10 | ... |
| ... | ... | ... | ... | ... | ... | ... | ... | ... | ... | ... | ... |
| a | POWER FLOW AMOUNT | 480 | 500 | ... | 300 | ... | 100 | 120 | ... | 300 | ... |
| ... | ... | ... | ... | ... | ... | ... | ... | ... | ... | ... | ... |

FIG. 6B

| OBJECTIVE FUNCTION | OBJECTIVE FUNCTION VALUE | | | | | | | |
|---|---|---|---|---|---|---|---|---|
| | INDIVIDUAL 1 | | | | INDIVIDUAL 2 | | | |
| | INITIAL STATE (0TH) | FIRST UPDATE | ... | P-TH UPDATE | INITIAL STATE (0TH) | FIRST UPDATE | ... | P-TH UPDATE |
| O1 | 130 | 110 | ... | 60 | 50 | 70 | ... | 60 |

FIG. 8

| NODE NAME | NAME | CLASS | RATED CAPACITY | LOAD | | | |
|---|---|---|---|---|---|---|---|
| | | | | EXPECTED VALUE | VARIATION VALUE | CASE 1 | CASE 2 | |
| AA | L1 | HOUSE | 1000 | 200 | 80 | 130 | 280 | ... |
| BB | L2 | FACTORY | 2000 | 1500 | 50 | 1490 | 1540 | ... |
| ... | ... | ... | ... | ... | ... | ... | ... | ... |

FIG. 10

| SYSTEM STATE CANDIDATE | | COMPARING DESTINATION STATE | | INTER-STATE DISTANCE |
|---|---|---|---|---|
| NAME | OBJECTIVE FUNCTION VALUE | NAME | OBJECTIVE FUNCTION VALUE | |
| 100 | 1020 | 95 | 1121 | 34.26 |
| | | 97 | 1051 | 22.87 |
| | | 103 | 1217 | 35.51 |
| | | 104 | 998 | 76.54 |
| | | 107 | 1089 | 42.22 |
| 115 | 1135 | 102 | 1141 | 89.2 |
| ... | ... | ... | ... | ... |

FIG. 12

| SYSTEM STATE CANDIDATE | | COMPARING DESTINATION STATE | | INTER-STATE DISTANCE | VARIABILITY EVALUATION VALUE | | |
|---|---|---|---|---|---|---|---|
| NAME | OBJECTIVE FUNCTION VALUE | NAME | OBJECTIVE FUNCTION VALUE | | OBJECTIVE FUNCTION VALUE AVERAGE | OBJECTIVE FUNCTION VALUE DIFFERENCE | $\Delta O/d$ |
| 100 | 1020 | 95 | 1121 | 34.26 | 1082.7 | 101 | 2.95 |
| | | 97 | 1051 | 22.87 | | 31 | 1.36 |
| | | 103 | 1217 | 35.51 | | 197 | 5.55 |
| | | 104 | 998 | 76.54 | | 22 | 0.29 |
| | | 107 | 1089 | 42.22 | | 69 | 1.63 |
| 115 | 1135 | 102 | 1141 | 89.2 | 1145.1 | 6 | 0.07 |
| ... | ... | ... | ... | ... | ... | ... | ... |

POWER SYSTEM MANAGEMENT DEVICE AND METHOD

BACKGROUND OF THE INVENTION

1. Field of the Invention

The present invention relates to a power system management device and a method which manage a system state to assist an operation of a power system.

2. Description of the Related Art

It becomes difficult to stably control a power system when an enormous amount of natural energy, which generates a steep power fluctuation caused by changes of a climate and an environment, is introduced in the power system. Also, when a large number of devices which control the fluctuation are introduced in the power system, a control structure becomes more complicated. Also, the control fitted to characteristics of the plurality of control devices becomes more difficult. Further, due to a change of a business system such as an electric power deregulation and unbundling generation and transmission services, it becomes more difficult to collectively control and manage the power system, because a plurality of business operators manages and operates the power system.

For the above business operator who operates the power system, an optimized control technique to stabilize the system has been devised. For example, JP-2007-110809-A discloses a support system and a support method for determining a condition in which a distributed power supply is interconnected with a distribution network. In the condition above, when the distribution network, which is interconnected in a branched (radial) shape, is interconnected with the distributed power supply, a quality of the electric power supply is stabilized. Also in the condition above, an applicant who wishes to be interconnected with the distributed power supply is satisfied (for example, to introduce as much power as possible). Disclosed is a method for calculating a tap position pattern in which the number of tap switching of a distribution transformer placed in a distribution substation and a weighted sum of a square sum of a power variation margin becomes the smallest. This calculation is performed under the restriction in which a voltage of the distribution network which is interconnected with the distributed power supply is kept within an allowable range.

SUMMARY OF THE INVENTION

However, while the technique according to JP-2007-110809-A obtains the tap position pattern, which is considered optimal, of the distribution transformer of a distribution system, a variability of the calculated pattern value is not considered. Also, matters not considered include a system interconnection of the distributed power supply using the natural energy, a change of a structure of a system control device according to the system interconnection above, and further, a variability of a system state quantity which is generated by a business change through a power deregulation and unbundling generation and transmission services. Therefore, the system state using the technique according to JP-2007-110809-A has a low reliability as the system state to stabilize the system.

Under the distribution network which is calculated as above, it is difficult to control the whole power system so as to realize an intention of an operator such as fuel cost minimization and voltage stability maximization. Therefore, there is a possibility that the system is significantly destabilized by changing a part of a system structure, and there is a significant risk.

To solve the above problem, the present invention includes a system state candidate calculation unit configured to calculate a plurality of state amounts of the system state based on a predetermined objective function from system characteristic information indicating characteristic information of the system structure including a load, a device, or a power transmission line connected to the power system, an inter-state distance calculation unit configured to calculate an inter-state distance representing a similarity of values between the plurality of state amounts of the system state which have been calculated by the system state candidate calculation unit, and a variability evaluation value calculation unit configured to calculate a variability evaluation value in which a variability of each system state is evaluated, based on an objective function value which is calculated from the state amount of the system state which has been calculated by the system state candidate calculation unit and the inter-state distance which has been calculated by the inter-state distance calculation unit. The system state is selected based on the variability evaluation value calculated by the variability evaluation value calculation unit.

Also, the present invention includes a method invention corresponding to the present device invention.

According to an embodiment of the present invention, it is possible to obtain an optimal system state quantity to stably operate a system by considering an output variation of a distributed power supply using natural energy and further, by evaluating a variability of the calculated system state quantity, while calculating a system state quantity of an optimal power system suitable for needs of an operator.

BRIEF DESCRIPTION OF THE DRAWINGS

FIGS. 4A to 4C are examples of a data structure of system characteristic information which is input/output to/from the power system management device;

FIG. 5 is an example of a data structure of objective function information which is input/output to/from the power system management device;

FIGS. 6A and 6B are examples of a data structure of system state information which is input/output to/from the power system management device;

FIG. 8 is an example of the data structure of the system characteristic information which is input/output to/from the power system management device;

FIG. 10 is an example of a data structure of inter-state distance information which is input/output to/from the power system management device;

FIG. 12 is an example of a data structure of variability evaluation value information which is input/output to/from the power system management device.

DESCRIPTION OF THE PREFERRED EMBODIMENTS

Preferred embodiments of the present invention will be described hereinafter. The embodiments below are only examples, and it is not intended that the invention be limited to any particular contents.

Embodiments of the present invention will be described below with reference to the drawings.

(First Embodiment)

Figure 1:
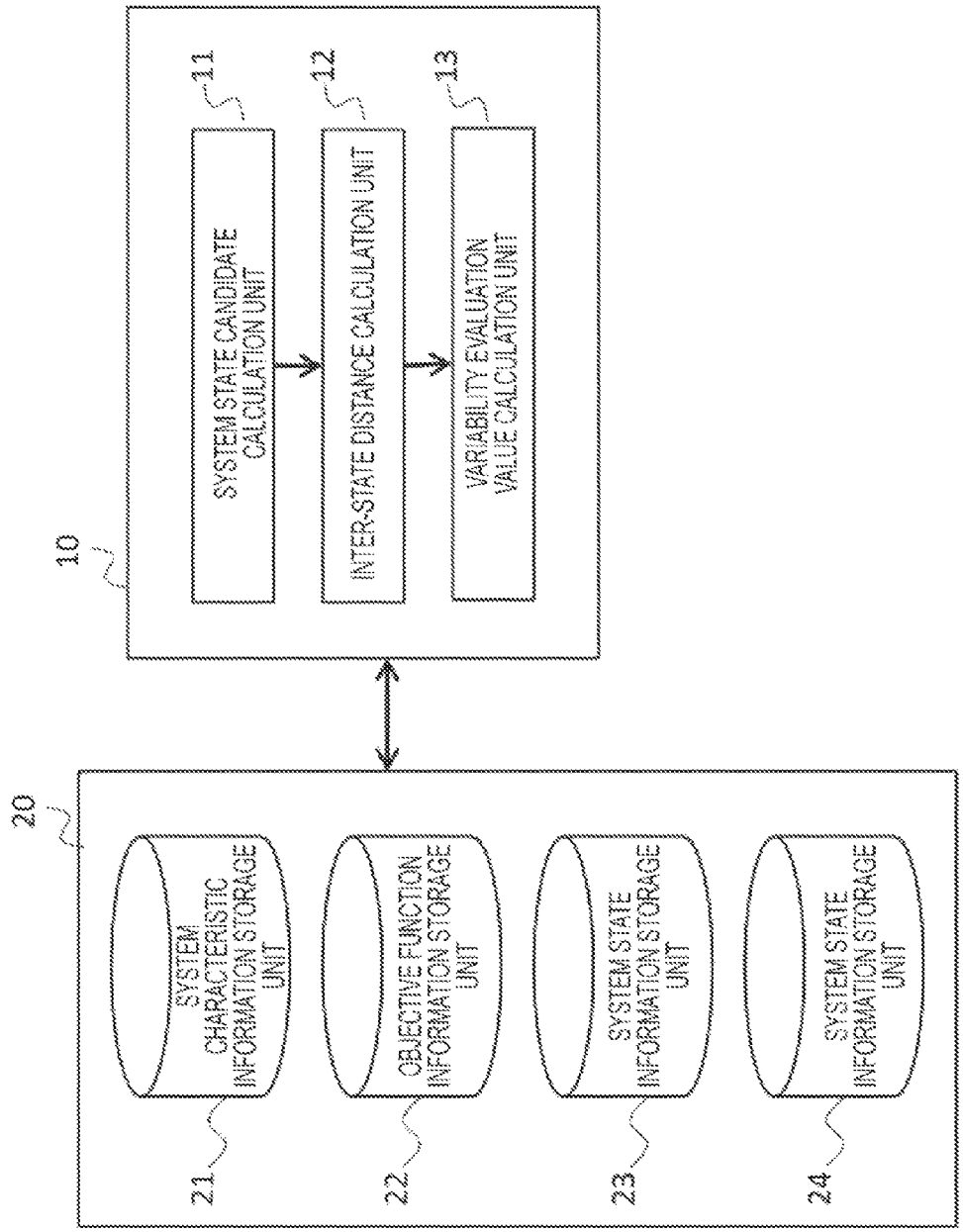
FIG. 1 is a block diagram of a function configuration diagram of a power system management device.

FIG. 1 is a function configuration diagram of a power system management device to which one embodiment of the present invention is applied. As shown in FIG. 1, the power system management device according to the present embodiment includes a system state calculation unit 10 and an information storage unit 20.

The system state calculation unit 10 includes a system state candidate calculation unit 11, an inter-state distance calculation unit 12, and a variability evaluation value calculation unit 13.

The system state candidate calculation unit 11 calculates a plurality of candidates of a system state by using system characteristic information stored in a system characteristic information storage unit 21 and objective function information stored in an objective function information storage unit 22. The system state candidate calculation unit 11 stores the calculation result in a system state information storage unit 23.

The inter-state distance calculation unit 12 calculates an inter-state distance between the system state candidate stored in the system state information storage unit 23 and other system state.

The variability evaluation value calculation unit 13 calculates a variability evaluation value by using an objective function value and inter-state distance information with respect to each system state candidate stored in the system state information storage unit 23.

The information storage unit 20 includes the system characteristic information storage unit 21, the objective function information storage unit 22, and the system state information storage unit 23.

The system characteristic information storage unit 21 stores characteristic information of system elements, such as a power generation amount and a load amount.

The objective function information storage unit 22 stores information on an objective function. The objective function is a mathematical formula which expresses an intention of an operator in the calculation of the system state.

The system state information storage unit 23 stores system state quantity information of the system element which is interconnected with a power system. The system state quantity includes a power generation amount by a power generator, a phase modifying amount in phase modifying equipment, a power flow amount in a power transmission line, and the like.

Figure 2:
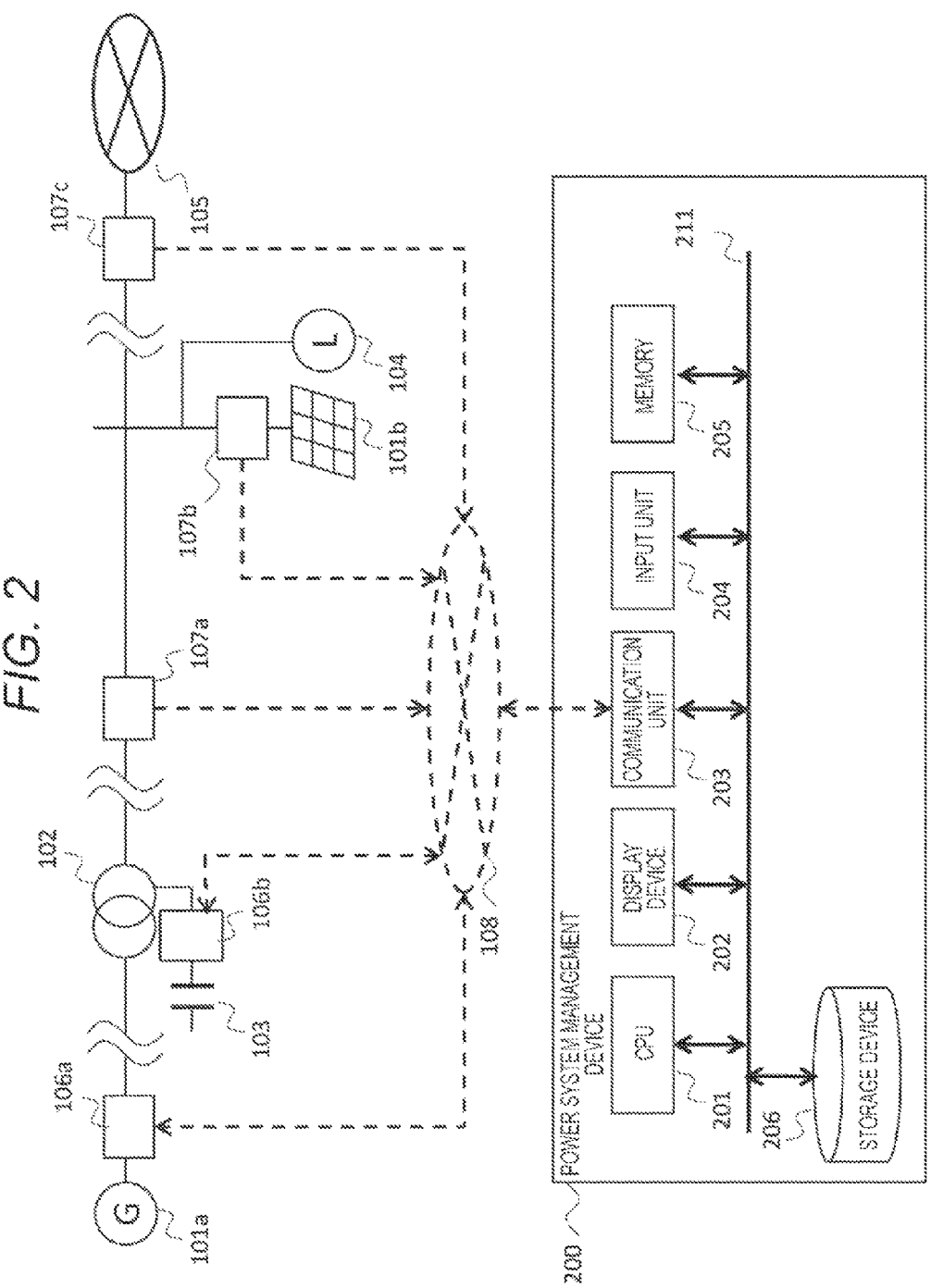
FIG. 2 is an example of a configuration diagram of a power system management system according to an embodiment of the present invention.

FIG. 2 is a configuration diagram of a power system management system to which one embodiment of the present invention is applied. As shown in FIG. 2, the power system management system of the present embodiment includes a power generator 101, an electric power substation 102, phase modifying equipment 103, an electric power load 104, an external power system 105, a control monitoring device 106, a monitoring device 107, an information communication network 108, and a power system management device 200.

The power generator 101 is a power generator which generates power by one of power generation methods including thermal power generation, hydraulic power generation, nuclear power generation, solar power generation, wind power generation, biomass power generation, and tidal power generation. A power generator 101a, which is placed on a high-voltage side of the power system, is a large-scale power generator including the thermal power generation, the hydraulic power generation, and the nuclear power generation. The power generator 101a transmits the system state quantity including the power generation amount to the power system management device 200 via the control monitoring device 106 and the information communication network 108. Also, the power generator 101a receives control command information which is transmitted from the power system management device 200 via the control monitoring device 106 and the information communication network 108 and changes the system state quantity including the power generation amount according to the control command information. A power generator 101b, which is placed on a low-voltage side of the power system, is a small or medium scale power generator including the solar power generation, the wind power generation, cogeneration and the like. The power generator 101b transmits the system state quantity including the power generation amount to the power system management device 200 via the monitoring device 107 and the information communication network 108.

The electric power substation 102 is placed between the power transmission lines in the power system. The electric power substation 102 changes a voltage value of the power transmitted from the high-voltage side where the power generator 101a, which is a large-scale power generator, is placed. The electric power substation 102 transmits the power to the low-voltage side where the electric power load 104 is placed. The electric power substation 102 is connected to the phase modifying equipment 103 such as a static condenser and a shunt reactor.

The phase modifying equipment 103 controls a voltage distribution in the power system by changing reactive power in the power system and includes the static condenser, the shunt reactor, a STATCOM, an SVC and the like. Some phase modifying equipment 103 receive the control command information which is transmitted from the power system management device 200 via the control monitoring device 106 and the information communication network 108 and change the system state quantity including the power generation amount according to the control command information.

The electric power load 104 represents a home, a factory, a building, and a facility which include an electric motor, lighting equipment or the like consuming power.

The power system management device 200 is unable to control the external power system 105. The external power system 105 is connected to the system in the power system management device 200 via an interconnection line.

The control monitoring device 106 includes a sensor for measuring the system state quantity such as a power generation amount by the power generator 101a, a phase modifying amount in the phase modifying equipment 103. The control monitoring device 106 transmits the measured system state quantity to the power system management device 200 via the information communication network 108.

Also, the control monitoring device 106 receives the control command information which is transmitted from the power system management device 200 via the information communication network 108 and changes the system state quantity such as the power generation amount in the power generator 101a and the phase modifying amount in the phase modifying equipment 103 according to the control command information.

The monitoring device 107 includes a sensor for measuring the system state quantity such as a power flow value and a voltage value in the power transmission line. The monitoring device 107 transmits the measured system state quantity to the power system management device 200 via the information communication network 108.

The information communication network 108 is capable of bidirectional data transmission. The information communication network 108 is configured to be, for example, a wired network, a wireless network, or a combination of the wired network and the wireless network. The information communication network 108 may be a so-called Internet or may be an exclusive line network.

The power system management device 200 is a device to realize a power system management function shown in FIG. 1. The power system management device 200 receives the system state quantity measured by the control monitoring device 106 and the monitoring device 107 via the information communication network 108. Also, the power system management device 200 transmits the control command information to the control monitoring device 106 via the information communication network 108. The control command information is calculated by the power system management device 200 by using the transmitted system state quantity of the system and the information accumulated therein.

In the power system management device 200, a central processing unit (CPU) 201, a display device 202, a communication unit 203, an input unit 204, a memory 205, and a storage device 206 are connected to a bus line 211. The CPU 201 executes a calculation program and performs calculation of the system state, generation of a control signal or the like. The memory 205 temporarily stores image data for display, calculation result data of the system state and the like. The memory 205 includes a random access memory (RAM) and the like. The memory 205 generates the image data necessary for the CPU 201 and displays the data on the display device 202. The communication unit 203 obtains the system state quantity such as the power flow value and the voltage value from the control monitoring device 106 and the monitoring device 107 via the information communication network 108.

A user can set/change a parameter such as a variety of thresholds through a predetermined interface of the input unit 204 and can appropriately set an operation of the power system management device 200. Also, the user can select a kind of data, which the user wishes to confirm, through the predetermined interface of the input unit 204 and can display the selected data on the display device 202.

The storage device 206 holds a variety of programs and data. The storage device 206 includes, for example, a hard disk drive (HDD), a flash memory or the like. The storage device 206 holds, for example, a program, data and the like which may realize a variety of functions which will be described below. The program and the data stored in the storage device 206 are read and executed by the CPU 201 as necessary. The storage device 206 includes a variety of databases DB.

Next, with reference to the flowchart shown in FIG. 3, a first example of system state candidate calculation processing in the power system management device 200 will be described. In the example below, the system state candidate calculation processing using particle swarm optimization (hereinafter referred to as PSO), which is one of optimization methods, will be described.

First, the system characteristic information and the objective function information with regard to the power system to be controlled are set (S31).

In FIGS. 4A to 4C, examples of data structures of the system characteristic information are shown.

In FIG. 4A, an example of a node of the power system and node information indicating information on the power generator, the electric power load, and the phase modifying equipment to which each node is connected is shown. In the example in FIG. 4A, it is indicated that nodes named nodes A and B are interconnected with the power generator. The node A is interconnected with a thermal power generator named G1 which has a rated capacity of 100, and the node B is interconnected with a wind power generator named G2 which has a rated capacity of 200. Also, in the example in FIG. 4A, it is indicated that nodes named nodes AA and BB are interconnected with the electric power load. The node AA is interconnected with a house named L1 which has a rated capacity of 1000. The node BB is interconnected with a factory named L2 which has a rated capacity of 2000. Also, in the example in FIG. 4A, it is indicated that nodes named AAA and BBB are interconnected with the phase modifying equipment. The node AAA is interconnected with a static condenser (SC) named D1 which has a rated capacity of 10. The node BBB is interconnected with a shunt reactor (ShR) named D2 which has a rated capacity of 20.

FIG. 4B is an example of power transmission line information indicating a characteristic of the power transmission line in the power system. In the example in FIG. 4B, it is indicated that a power transmission line named a exists between the nodes A and B. The power transmission line has a positive-phase-sequence resistance of 0.01, a positive-phase-sequence reactance of 0.2, and a positive-phase-sequence capacitance of 0.1.

FIG. 4C is an example of a constraint condition regarding the system element in the power system. In the example in FIG. 4C, it is indicated that, as a first constraint condition, the maximum value of an effective power generation amount of the power generator G1 is 100 and the minimum value thereof is 10. Also, it is indicated that the maximum value of the phase modifying amount of phase modifying equipment D1 is 10 and the minimum value thereof is 0. Similarly, it is indicated that the maximum value of a power flow amount a is 500.

Here, the data structures shown in FIGS. 4A to 4C are only exemplary, and more detailed system characteristic information may be stored. For example, as information on the node interconnected to the thermal power generator in FIG. 4A, a dynamic characteristic such as a governor constant may be stored. Also, as the information on the node interconnected to the power generator for generating power by natural energy, such as the wind power generator in FIG. 4A, a probabilistic power generation amount variation characteristic, which has been calculated by a statistical analysis by using a past history, may be stored. Also, as the constraint condition regarding the power generator in FIG. 4C, the dynamic characteristic such as a maximum output change rate may be stored.

FIG. 5 is an example of a data structure of the objective function information.

FIG. 5 is a data structure example indicating a candidate of the objective function which is set in advance. In the example of FIG. 5, an objective function O1 represents an intention of an operator to minimize a fuel cost. The system state which follows the intention of the operator is calculated by minimizing a mathematical formula f1 (x1), in which a power generation amount x1 is assumed to be an input, representing the fuel cost. Similarly, an objective function O2 represents the intention of the operator to maximize voltage stability. The system state which follows the intention of the operator is calculated by maximizing a mathematical formula f2 (x1, x2, . . . ), in which a voltage x1 and a power flow amount x2 . . . are assumed to be inputs, representing the voltage stability. As the candidate of the objective function, it is preferable to store fuel cost minimization, transmission loss minimization, system stability maximization, minimization of the number of times of phase modifying equipment operation or the like. The user selects one objective function used for the analysis from among the above-mentioned objective functions O1, O2 . . . Also, the user may select a plurality of objective functions from among the above-mentioned objective functions O1, O2 . . . The user may calculate a weighted sum of the selected objective function values, and the weighted sum may be assumed to be the objective function value.

Figure 3:
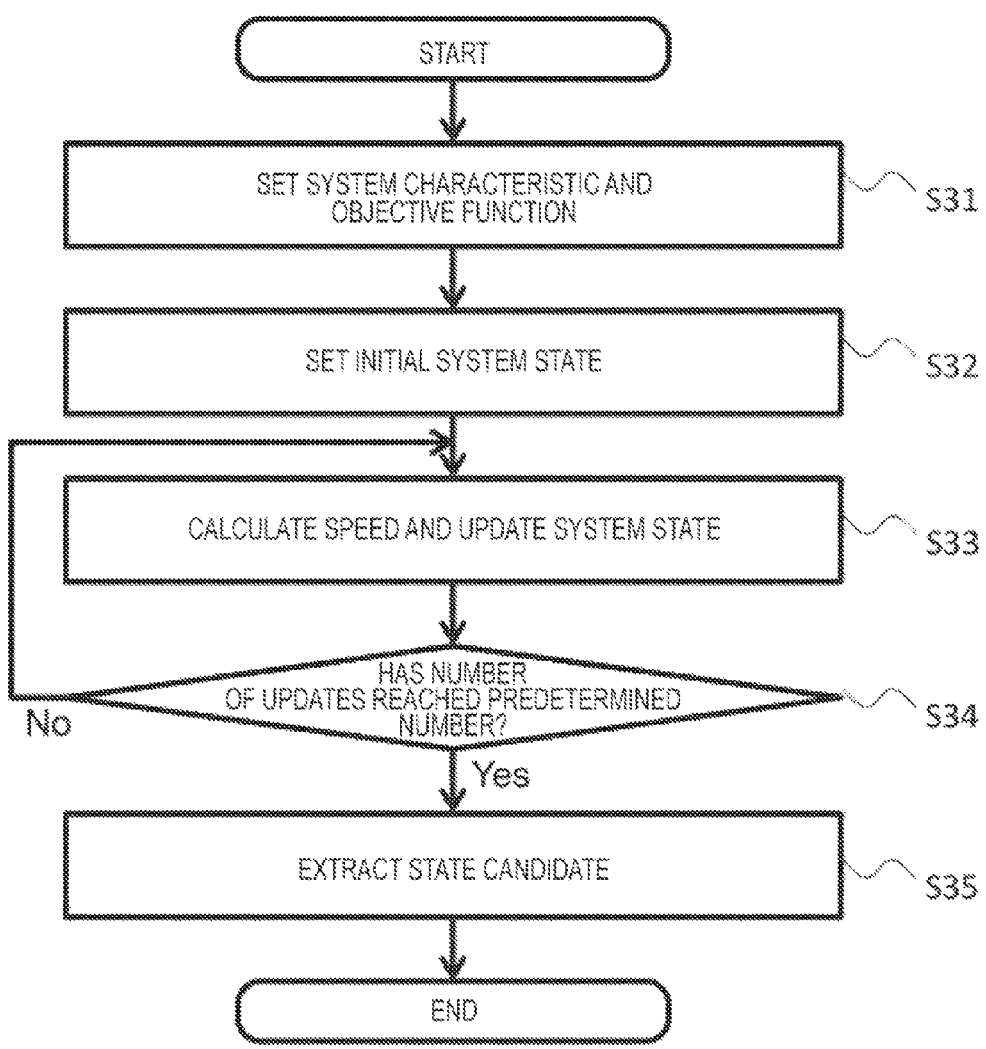
FIG. 3 is a first example of a flowchart of system state candidate calculation processing of the power system management device.

The description is returned to the flowchart of the system state candidate calculation processing shown in FIG. 3.

Next, an initial system state is set at each search point, in which a calculation technique is different or an initial setting value is different (S32).

FIGS. 6A and 6B are examples of data structures of the system state information including the initial system state. FIG. 6A is a data structure example of the system state quantity of each system element in the system state of each search point. In the example of FIG. 6A, the system state quantity of the power generator G1, the phase modifying equipment D1, and the power transmission line a is stored. In this example, the stored information on the power generator G1 is the power generation amount. In the initial system state at a search point 1, the system state quantity of the power generator G1 is 90. FIG. 6B is an example of the objective function value in the system state of each search point. The objective function value is calculated by inputting the system state quantity of each system element shown in FIG. 6A into the calculation formula of the objective function selected in S31. In the example of FIG. 6B, the objective function value of each search point upon selection of the objective function O1 is shown.

Next, a speed is calculated at each search point, and the system state is updated (S33). The speed is calculated by the following (expression 1).

$$v_{ij}^{k+1} = \omega \cdot v_{ij}^k + c_1 \cdot \text{rand}_1(\ )_{ij} \cdot (pbest_{ij}^k - x_{ij}^k) + c_2 \cdot \text{rand}_2(\ )_{ij} \cdot (gbest_j^k - x_{ij}^k) \quad \text{(expression 1)}$$

Here, $v_{ij}^k$ is a speed at a k-th update of a j-th system element of an i-th search point.

Also, $pbest_{ij}^k$ is a j-th system element which has the best objective function value in the system states at the updates, which are up to k-th update, of the i-th search point.

$gbest_j^k$ is a j-th system element which has the best objective function value in the system states at the updates, which are up to k-th update, of all the search points.

Here, regarding the objective function which is set as a form in FIG. 5, the best objective function value means that an objective function is minimized when the objective functional form is "min", and an objective function is maximized when the objective functional form is "max". Also, $\text{rand}_1(\ )_{ij}$ and $\text{rand}_2(\ )_{ij}$ are random numbers having values of 0 to 1. $\omega$, $c_1$, and $c_2$ are coefficients for determining a weight of each item.

By using the speed $v_{ij}^k$ which is calculated above, a system state $x_{ij}^{k+1}$ at (k+1)th update is calculated from a system state $x_{ij}^k$ at k-th update of the i-th search point by (expression 2) below.

$$x_{ij}^{k+1} = x_{ij}^k + v_{ij}^{k+1} \quad \text{(expression 2)}$$

The calculated system state $x_{ij}^{k+1}$ is stored in the storage device 206.

Next, it is determined whether the number of the updates has reached the number of times specified in advance (S34). When the number of the updates does not reach the number of times specified in advance, system state update processing in S33 is repeated. The update of the system state at each search point and the storage into the storage device 206 are repeated.

In S34, when the number of the updates has reached the specified number of times, the system state candidate is extracted from the system states stored in the storage device 206 (S35). At this time, by the processing from S31 to S34, the system state candidate is extracted from all the system states stored in the storage device 206 by using the objective function value in the respective system states. For example, the number of the system states to be extracted is predetermined. When the form of the objective function is "min", the predetermined number of the system states above in ascending order of the objective function value may be extracted as the candidate. Similarly, when the form of the objective function is "max", the predetermined number of the system states above in descending order of the objective function value may be extracted as the candidate.

According to the above processing, the system state candidate is extracted.

In the example of processing shown by the flowchart in FIG. 3 above, the PSO which is an optimization method is used in the processing in the system state candidate calculation unit. At this time, the system state candidate calculation processing may be executed by using other optimization methods. That is, the system state candidate calculation processing may be executed by using one of the methods such as linear programming, nonlinear programming, an interior point method, a genetic algorithm, evolutionary programming, a tabu search, and a neural network.

Figure 7:
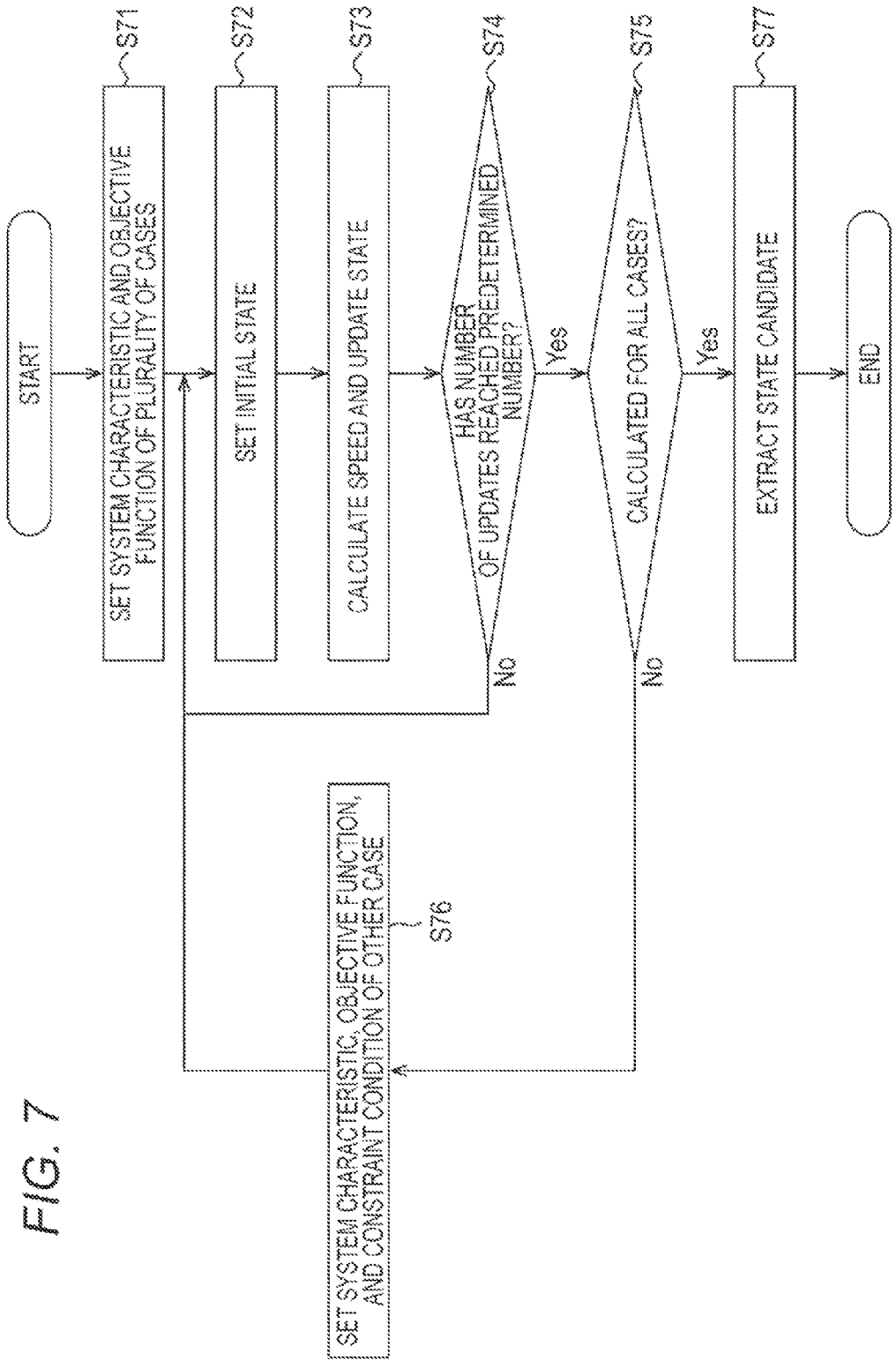
FIG. 7 is a second example of the flowchart of the system state candidate calculation processing of the power system management device.

Next, a second example of the system state candidate calculation processing in the power system management device 200 will be described with reference to a flowchart shown in FIG. 7. In the example below, the system state candidate calculation processing using a Monte Carlo method will be described.

First, the system characteristic information and the objective function information on the power system to be controlled of a plurality of cases are set (S71). Here, when the system characteristic information of the plurality of cases is set, the plurality of cases may be calculated by using an expected value and a variation value as the system state quantity of each item which represents the system state. For example, when load data shown in FIG. 8 is stored in the storage device 206, the system state quantity P of each system item may be calculated from (expression 3) below by using a predicted value Pe and a variation value ΔP of each system item.

$$P=Pe+\text{rand}_3(\ )\times\Delta P \quad \text{(expression 3)}$$

Here, $\text{rand}_3(\ )$ is a random number which has a value of −1 to 1. According to (expression 3), the system characteristic information of the plurality of cases is calculated by calculating the system state quantity of each system item by using a different random number value $\text{rand}_3(\ )$. In the processing, the system state quantity may be obtained by applying the power generation amount other than the load to the phase modifying equipment. According to this processing, a plurality of situations can be analyzed in which a variation of renewable energy such as solar power generation and wind power generation, a variation of the load, and an influence caused by another system, which is interconnected with the system to be controlled and is unable to be observed, are considered.

The objective function is set by processing similar to the processing of S31 shown in the flowchart of FIG. 3.

Next, the initial system state at each search point is set (S72). The system state of each search point is updated by using the calculated speed (S73). By updating the system state repeatedly up to the predetermined number of times (S74), the system state is stored in the storage device 206. The above processing S72, S73, and S74 is executed by the PSO algorithm similarly to the processing S32, S33, and S34. At this time, the above processing may be executed by using other optimization methods. That is, any of the methods such as the linear programming, the nonlinear programming, the interior point method, the genetic algorithm, the evolutionary programming, the tabu search, and the neural network may be used.

Next, it is determined whether the processing S72, S73, and S74 above has been performed regarding all the cases set in S71 (S75). When the processing has not been performed regarding all the cases, the processing S72, S73, and S74 is repeated regarding another case (S76). Regarding each case which is set in S71, the update of the system state and the storage into the storage device 206 are repeated. When the system state calculation regarding all the cases has been completed in S75, the system state candidate is extracted from the system states stored in the storage device 206 (S77). The processing in S74 is performed through the procedure similar to the processing in S35.

According to the above processing, the system state candidate is extracted. Through the system state candidate calculation processing of the above-mentioned second example, the system can be managed. In the system management, the variation of renewable energy such as solar power generation and wind power generation, the variation of load, and the influence caused by another system, which is interconnected with the system to be controlled and is unable to be observed are more accurately considered.

Figure 9:
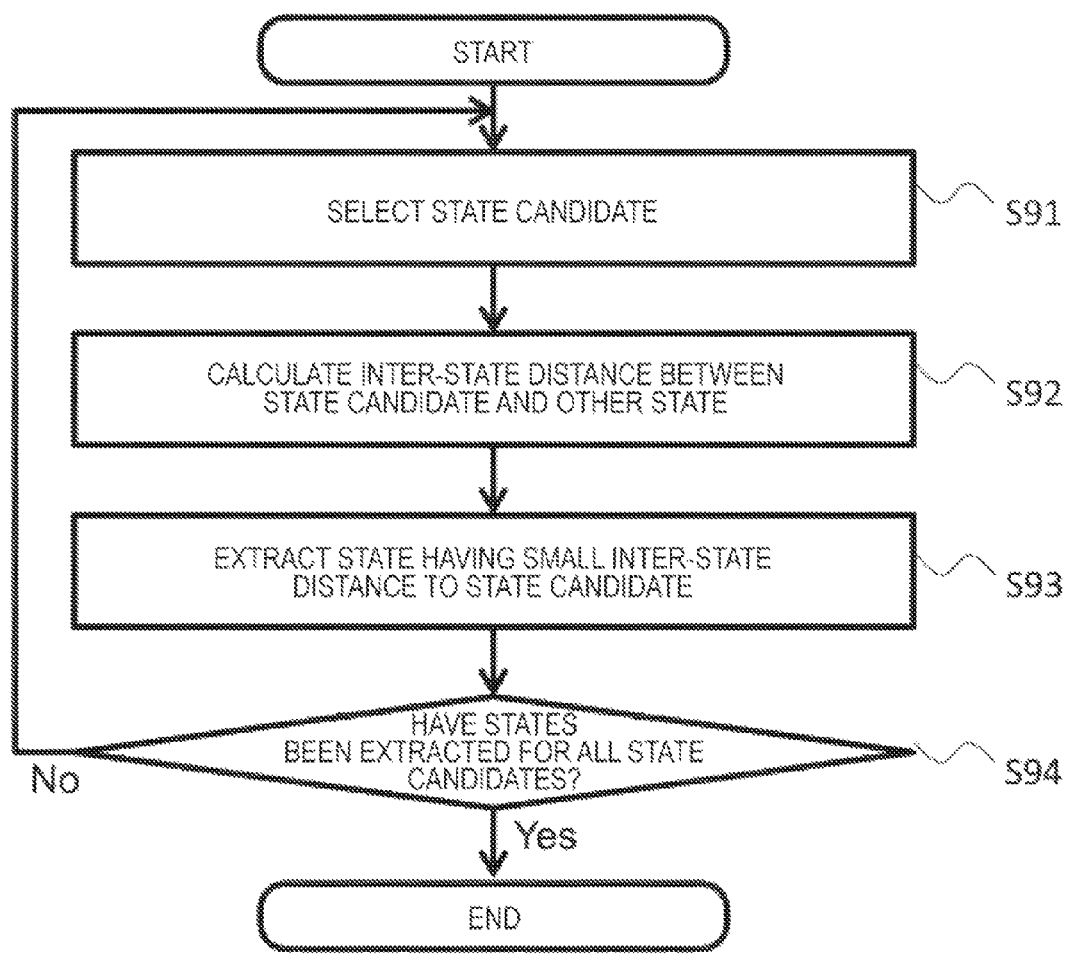
FIG. 9 is an example of a flowchart of inter-state distance calculation processing of the power system management device.

Next, inter-state distance calculation processing in the power system management device 200 will be described with reference to a flowchart shown in FIG. 9.

First, one system state is selected as a comparing source system state from among the system state candidates stored in the storage device 206 (S91).

Next, an inter-state distance is calculated (S92). The inter-state distance is a distance between the comparing source system state selected in S91 and the system state stored in the storage device 206 (assumed to be a comparing destination). The inter-state distance d is calculated by using (expression 4) below.

$$d=\Sigma\omega_j(x_j-x_j')^2 \quad \text{(expression 4)}$$

Here, $x_j$ is a j-th item of the comparing destination system state, and $x_j'$ is a j-th item of the comparing source system state. $\omega_j$ is a coefficient which represents a weighting to each item representing the system state. The inter-state distance d between a plurality of system states $x_j$ and the comparing source system state $x_j'$ is calculated by using (expression 4). The result is stored in the storage device 206.

Next, the comparing destination system state which has a small inter-state distance to each system state candidate is extracted and stored in the storage device 206 (S93). At this time, the number of the comparing destination system states to be extracted is determined in advance. The above number of the comparing destination system states may be extracted in ascending order of the inter-state distance. Also, a certain threshold is predetermined, and all the comparing destination system states which have an inter-state distance equal to or less than the above threshold may be extracted.

Finally, regarding all the system state candidates, it is determined whether a corresponding comparing destination system state has been extracted (S94). When the comparing destination system states corresponding to all the system state candidates have not been extracted, the processing of S91, S92, and S93 is performed to the system state candidate to which the above processing is not performed. When the comparing destination system states corresponding to all the system state candidates have been extracted, the inter-state distance calculation processing is terminated.

FIG. 10 is an example of information of each system state candidate and the inter-state distance stored in the storage device 206. In the example of FIG. 10, five system states "95", "97", "103", "104", and "107" which have small inter-state distances relative to the system state candidate "100" are extracted and are stored together with the respective inter-state distances to the system state candidate "100". Further, regarding the system state candidate and the extracted comparing destination system state, the objective function value is stored.

Figure 11:
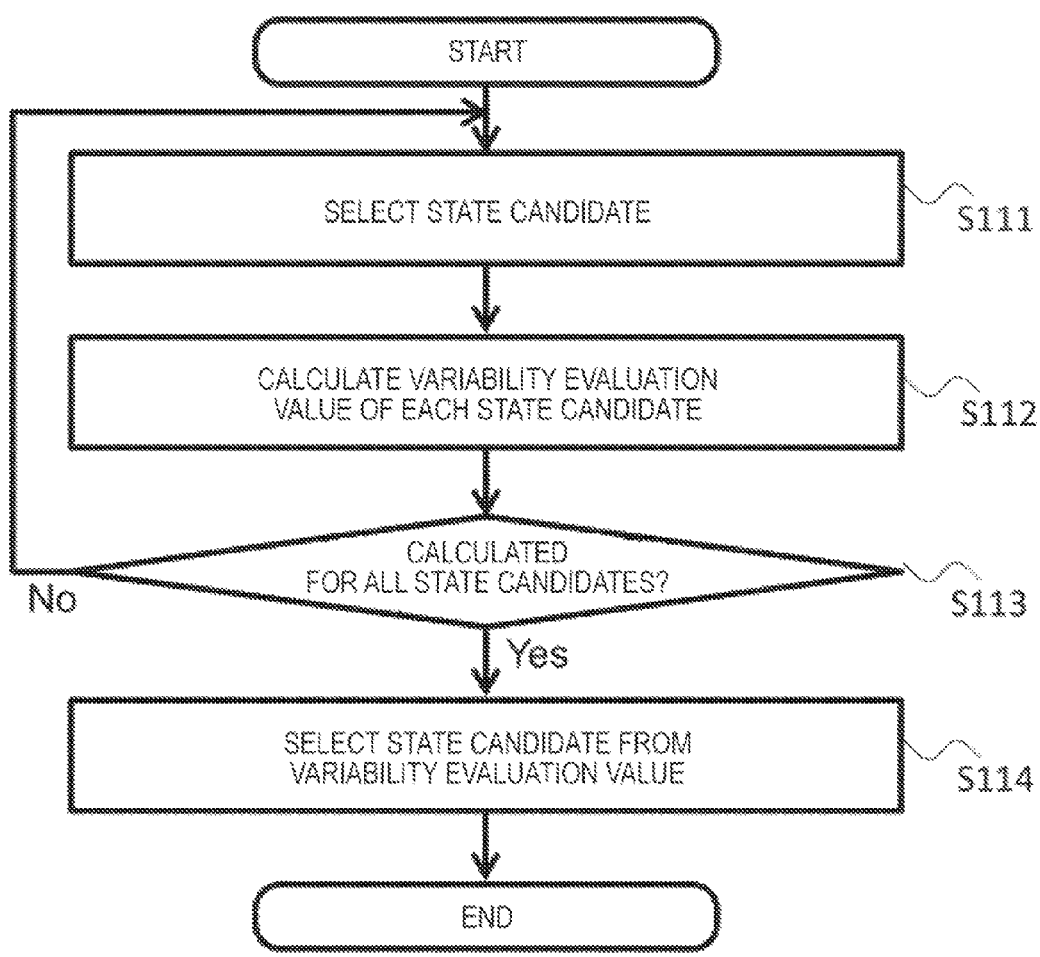
FIG. 11 is an example of a flowchart of variability evaluation value calculation processing of the power system management device.

Next, variability evaluation value calculation processing in the power system management device 200 will be described with reference to a flowchart in FIG. 11.

First, one system state candidate is selected from among the system state candidates stored in the storage device 206 (S111). Next, a variability evaluation value of the selected system state candidate is calculated (S112). As an example of the variability evaluation value, an average value of the objective function values may be used. FIG. 12 is an example of information of each system state candidate stored in the storage device 206 and the variability evaluation value. In the example of FIG. 12, as a first variability evaluation value relative to the system state candidate "100", the average value of the objective function values of five system states "95" "97", "103", "104", and "107" which have small inter-state distances and the system state candidate "100" are calculated and stored in the storage device 206. As mentioned above, by using the average value of the objective function values near the system state candidate as the variability evaluation value, a system operation state to optimize the objective function is obtained in consideration of the variation of renewable energy such as solar power generation and wind power generation, the variation of load, and the influence caused by another system, which is interconnected with the system to be controlled and is unable to be observed. Also, as another example of the variability evaluation value, a change ratio of the objective function value per unit inter-state distance may be used. In the example of FIG. 12, regarding five system states "95", "97", "103", "104", and "107" which have small inter-state distances to the system state candidate "100", a difference ΔO between the respective objective function values and the objective function value of the system state candidate "100" is calculated and stored in the storage device 206. Further, a rate of variability ΔO/d of the objective function is calculated by processing in which the difference ΔO of the objective function value, which is obtained by the above processing, is divided by the inter-state distance d between the respective system states and the system state candidates "100". The rate of variability ΔO/d is stored in the storage device 206. As mentioned above, by using the change ratio of the objective function value per unit inter-state distance as the variability evaluation value, an operation state can be determined based on more detailed information on the change of the objective function value when the system state varies.

Next, regarding all the system state candidates, it is determined whether the variability evaluation values have been calculated (S113). When the variability evaluation values are not calculated for all the system state candidates, another system state candidate is selected, and the variability evaluation value is calculated. When the variability evaluation values have been calculated for all the system state candidates, the system state candidate is selected from among the variability evaluation values (S114). As a method for selecting the system state candidate, when the above-mentioned average value of the objective function values is used as the variability evaluation value, the system state candidate which has the smallest average value of the objective function values may be selected. According to the above method, the system state candidate which allows the objective function value to be the smallest can be selected in consideration of the variation of the system state.

Also, as a method for selecting the system state candidate, when the above-mentioned rate of variability of the objective function value is used as the variability evaluation value, the maximum values of the rates of variability of the objective function values in the adjacent system states are compared with each other between the system state candidates. The system state candidate which has the smallest maximum value may be selected. According to the above method, the system state candidate, which allows the variation of the objective function value relative to the variation of the system state to be the smallest, can be selected.

Also, as a method for selecting the system state candidate, the average value and the rate of variability of the objective function value may be used together. For example, a system state candidate which has the smallest average value of the objective function value may be selected from among the system state candidates having the rate of variability, which is less than a certain threshold, of the adjacent objective function value. According to the above-mentioned method, a system state candidate can be selected. The system state candidate allows the objective function value to be the smallest while suppressing the variation of the objective function value relative to the variation of the system state.

What is claimed is:

1. A power system management device configured to manage a system state in a power system, comprising:
   a system state candidate calculation unit configured to calculate a plurality of state amounts of the system state based on a predetermined objective function from system characteristic information indicating characteristic information of a system structure including a load, a device, or a power transmission line connected to the power system;
   an inter-state distance calculation unit configured to calculate an inter-state distance, wherein the inter-state distance is a distance value between the system state and a different system state; and
   a variability evaluation value calculation unit configured to calculate a variability evaluation value in which a variability of each system state is evaluated, based on an objective function value which is calculated from the state amount of the system state which has been calculated by the system state candidate calculation unit and the inter-state distance which has been calculated by the inter-state distance calculation unit, wherein
   the system state is selected based on the variability evaluation value calculated by the variability evaluation value calculation unit.

2. The power system management device according to claim 1, wherein
   the predetermined objective function includes functions relevant to a fuel cost, a transmission loss, a system stability, or the number of times of a control device operation.

3. The power system management device according to claim 1, wherein
   the system state candidate calculation unit weights a plurality of objective functions and calculates the state amount of the system state.

4. The power system management device according to claim 1, wherein
   the inter-state distance is calculated based on the state amount of the system state which has a predetermined number of objective function values in ascending/descending order from the smallest/largest value within the objective function values obtained by the system state candidate calculation unit.

5. The power system management device according to claim 1, wherein
   the system characteristic information includes an expected value and a variation value of a system state amount.

6. The power system management device according to claim 1, wherein
   the variability evaluation value is calculated regarding the system state which has any of a predetermined number of values of the inter-state distance in ascending order from the smallest value or a value of the inter-state distance within a predetermined threshold among the values of the inter-state distance which have been calculated by the inter-state distance calculation unit.

7. The power system management device according to claim 1, wherein
   the variability evaluation value is obtained from an average value of the plurality of objective function values, a difference between the plurality of objective function values, or a value obtained by dividing the value of the inter-state distance by the objective function value.

8. The power system management device according to claim 1, wherein
the state amount of the system state includes a power generation amount by a power generator, a control amount by a power system control device, a power flow amount in the power system, or a voltage amount in the power system.

9. The power system management device according to claim 1, further comprising:
a communication unit configured to obtain information including the system state in the power system.

10. The power system management device according to claim 1, wherein
a control command is transmitted to a control device of the power system based on a determined system state amount of the power system.

11. The power system management device according to claim 1, wherein
a system state amount in a selected system state is displayed.

12. The power system management device according to claim 1, wherein
the system state candidate calculation unit obtains a system state amount which minimizes/maximizes the objective function value by using a method which includes linear programming, nonlinear programming, an interior point method, a genetic algorithm, evolutionary programming, a tabu search, a neural network, or PSO.

13. A power system management method for managing a system state in a power system, comprising:
calculating a plurality of state amounts of the system state based on a predetermined objective function from system characteristic information indicating characteristic information of a system structure including a load, a device, or a power transmission line connected to the power system;
calculating an inter-state distance, wherein the inter-state distance is a distance value between the system state and a different system state;
calculating a variability evaluation value in which a variability of each system state is evaluated based on an objective function value which is calculated from the calculated state amount of the system state and the calculated inter-state distance; and
selecting the system state based on the calculated variability evaluation value.

* * * * *